UNITED STATES PATENT OFFICE.

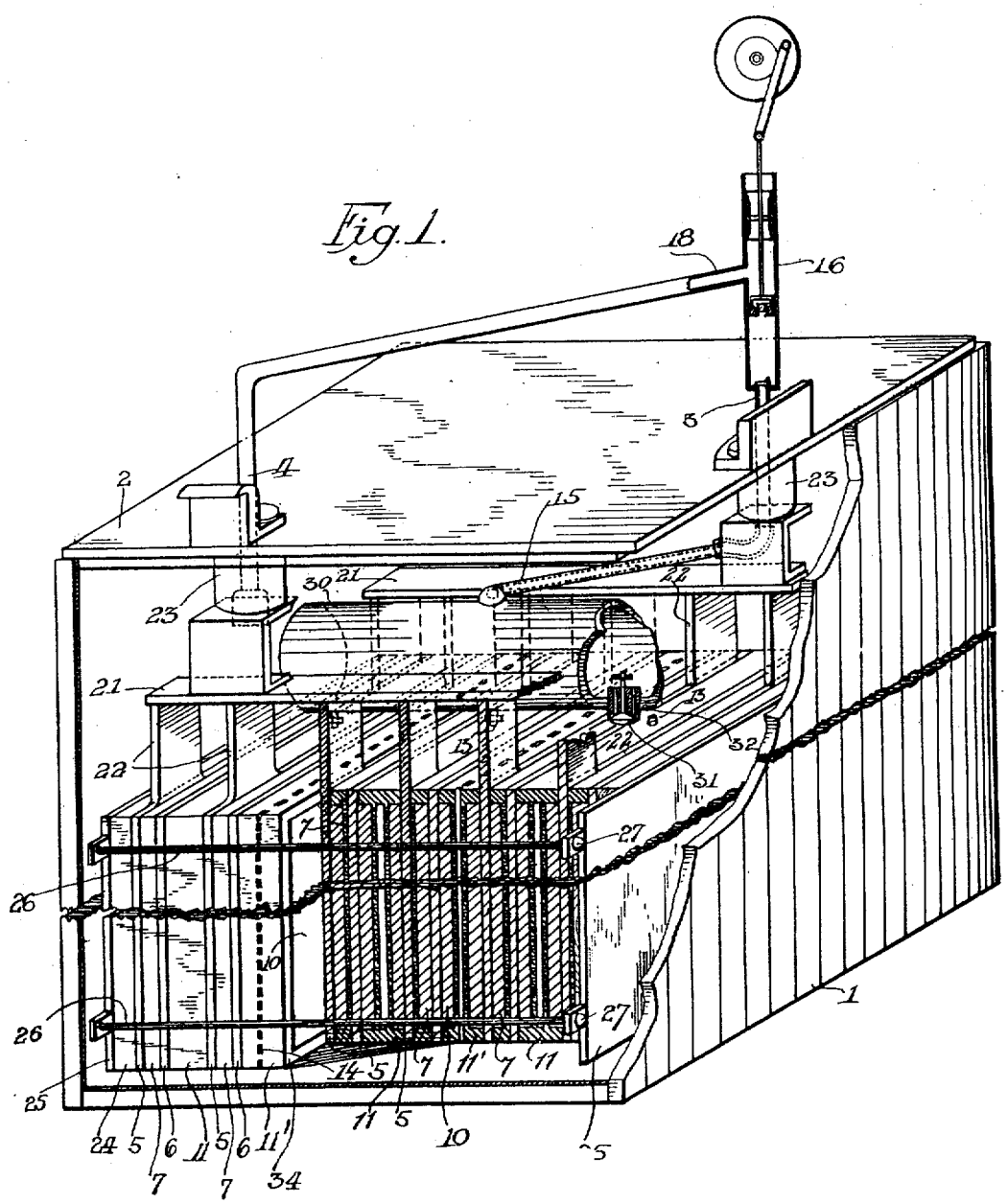

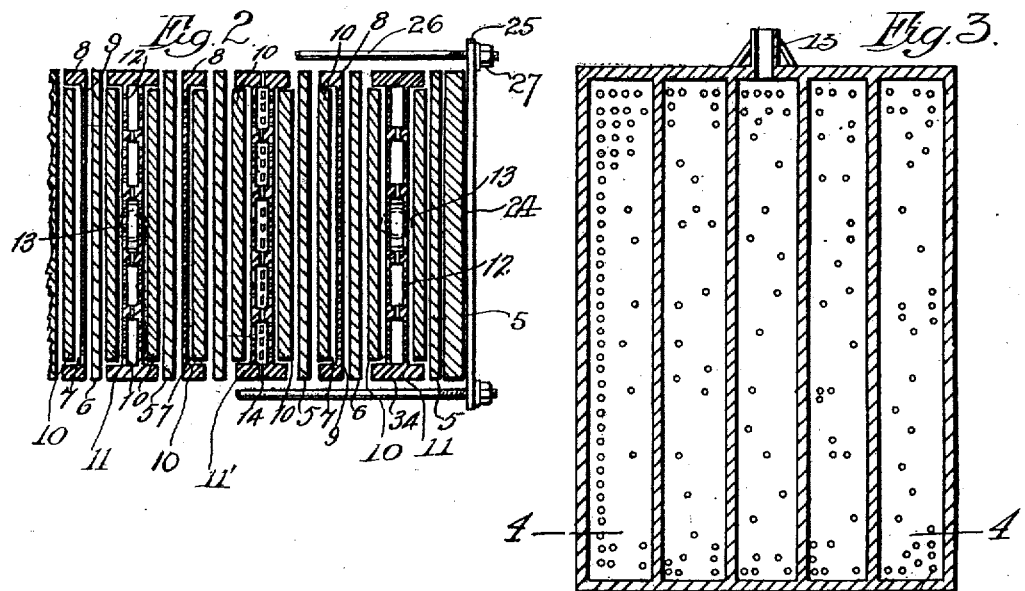
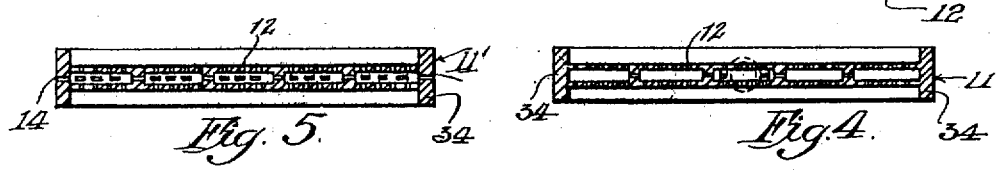

EDWARD SOKAL, OF CHICAGO, ILLINOIS.

BATTERY.

1,258,265.  Specification of Letters Patent.  Patented Mar. 5, 1918.

Application filed November 21, 1914. Serial No. 873,293.

*To all whom it may concern:*

Be it known that I, EDWARD SOKAL, a subject of the Emperor of Austria, and a resident of Chicago, in the county of Cook and State of Illinois, have invented new and useful Improvements in Batteries, of which the following is a specification.

This invention relates to batteries and may be applied to primary, as well as to secondary or storage batteries.

An object of the invention is to provide a battery wherein the electrolyte is forcibly conducted through the pores of the electrodes, whereby the polarization of the battery is delayed or entirely prevented, and whereby the saturation of the electrolyte in close proximity to the pores is increased.

Another object of the invention is to provide a battery wherein means are included for spacing the electrodes from each other, the spacing means being adapted to permit the circulation of the electrolyte through the electrodes and through the space of the vessel or tank in which the electrodes are held.

Another object of the invention is to provide a battery which is composed of a plurality of units, each unit comprising one pair of electrodes whereby the assembly of the battery is greatly facilitated.

Another object of the invention is to provide a battery wherein the difficulty of packing or tightening the electrodes with respect to each other, by means of a cement, putty or similar packing means to be applied rigidly to the electrodes during the assembling of the battery is avoided.

Another object of the invention is to provide a battery comprising hollow spaces between the different units and to connect certain of these spaces, with a means for forcing the electrolyte, either by pressure or by suction, through the pores of the electrodes.

Another object of the invention is to provide a battery wherein a plurality of units forming a cell, may be readily combined or disassembled and wherein these units are rigidly held together as long as the battery is in use.

With these and other objects in view, I have illustrated an embodiment of the invention in the accompanying drawing which shows the application of the invention to a storage battery although it is readily understood that the invention may as well be applied to primary batteries having porous electrodes of uniform or varying porosity.

In the drawing—

Figure 1 is a perspective view partly in section of a receptacle or jar showing a plurality of units of a storage battery with spacing means and with means for causing circulation of the electrolyte through the jar, said circulating means being shown diagrammatically only.

Fig. 2 is a horizontal section through the battery on line 2—2 of Fig. 1 and shows portions of the battery only wherein for the sake of clearness adjacent elements are shown separated from each other and not in as close juxtaposition as they are located in the assembled battery.

Fig. 3 is a longitudinal section through the spacing means between two units of electrodes.

Fig. 4 is a horizontal section on line 4—4 of Fig. 3.

Fig. 5 is a horizontal section similar to Fig. 4 through another spacing means between units.

Fig. 6 is a side elevation of a spacing means located between electrodes of the same unit.

It has been found that the efficiency of primary cells or of storage cells may be enhanced by forcibly conducting the electrolyte, either in one direction through the pores of the electrodes or by forcibly conducting the electrolyte intermittently in different directions through said pores. In the batteries which were in use up to the present time in connection with the circulating means for the electrolyte, it was necessary either to provide electrodes in the form of hollow bodies or to provide packing means rigidly connected with and interposed between, adjacent electrodes. As a packing means for these purposes only certain kinds of cement or compounds could be used and it was difficult to connect these insulating compounds securely with the metal electrodes or with other electrodes.

In applying a cement or putty to objects which have to be united it is necessary to press the two objects firmly against each other, so as to avoid any interspace between the same. In batteries, however, it is necessary to leave an interspace between juxtaposed electrodes, not only to avoid a short circuit of said electrodes but also in order to provide a space for the electrolyte so that the liquid may act on the surface of the electrodes. If therefore in the known batteries a pressure was exerted upon the electrolyte in this interspace, this pressure acted upon the said packing means in a manner which had a tendency to loosen the packing means or to detach the packing means from the electrodes.

These conditions are very unfavorable to the application of any packing means in the form of cement and in the present invention, therefore, the packing means themselves must not necessarily be rigidly connected with the different electrodes, although packing means may be used. The spacing means serve in the present invention as a packing means or the electrolyte may be conveyed into and out of the spacing means between the electrodes.

Moreover, in the embodiment of the present battery, the pressure or suction, or whatever force is used for causing circulation of the electrolyte, will have a tendency to force the packing means against the electrodes and will, therefore, have a tendency to increase the packing effect.

The embodiment illustrated comprises a jar 1, which may be made of any suitable material, as glass, hard rubber, or the like, or which may be made of wood and may be provided with a lining of lead or some similar substance, which is not attacked by the electrolyte within the jar. This electrolyte may consist of sulfuric acid or it may consist of some other fluid in accordance with the composition of the electrodes, the invention being applicable to the ordinary lead storage battery, to primary batteries or to storage batteries wherein the electrodes are composed of iron, nickel, cobalt or similar metals and metal compounds. The jar is hermetically sealed by means of a cover 2 of lead or wood, and in the present instance means are shown for conveying the electrolyte through nipples 3 and 4 within the cover, one of said nipples serving for introducing the electrolyte while the other one serves for withdrawing the same from the jar.

The battery comprises a plurality of positive plates 5 and negative plates 6, which are serially disposed, and in alternating arrangement with respect to their polarity.

The electrodes are arranged in the form of units. Each unit comprises a positive plate 5 and a negative plate 6 and spacing means 7 between the two plates. The spacing means consist in the present instance of a hard rubber plate 8 which is perforated as indicated at 9 and which is in engagement with one of the electrodes of the unit, said plate 8 being constructed in the form of a shallow trough and containing a porous plate 10, made of wood or some similar porous material.

Spacing and fluid conveying means are also inserted between each two units and these unit spacing means comprise preferably a hollow box or casing 11 and 11' advisably made of hard rubber or some similar suitable insulating material, interposed between the electrodes of different polarities of adjacent units. The lateral walls of the unit spacing means are also provided with perforations 12, permitting thereby any fluid conveyed into the casing to come into contact with the faces of the adjacent electrodes. The spacing means between units alternate in construction in as far as one of each pair of casings indicated at 11 is provided with a tubing 13 leading into the hollow interior of the casing, while the other of the two casings, indicated at 11', is closed on top and communicates only with the interior of the jar by means of perforations 14 in the end walls of the casing.

The tubings 13 extending from the cell casings 11 are united into a manifold 15 which is led through one of the nipples in the cover of the jar, said cover being secured by means of screws or some other suitable fastening means to the jar. A pump diagrammatically indicated at 16 is connected with both of these nipples in the cover of the jar and serves for forcibly conveying the electrolytic fluid through one of said nipples into the interior of said casings 11 and the fluid is returned to the pump through the pipe 18 connected with the other nipple in the jar. It is obvious, however, that the direction of the circulation of this fluid may also be reversed, whereby the fluid would be withdrawn from the interior of the jar through the unit spacing means and would be returned to the jar by means of said pump and through the pipe 18. Any suitable fluid conveying device may be used for maintaining the electrolytic fluid in circulation in one direction or for intermittently reversing the direction of the circulation.

In the embodiment illustrated the pump shown diagrammatically at 16 acts as a suction pump and serves for conveying the electrolytic fluid from the interior of the spacing casings 11 into a reservoir or tank 30, shown partly in section and partly perspectively in Fig. 1. A check valve 31 disposed near one end of said reservoir serves for returning the fluid from said reservoir into the jar 1 when the suction of the pump ceases and when at the same time the amount of fluid within the reservoir is large enough to force the check valve 31 downwardly and away from its valve seat 32. It is obvious, however, that other constructions for suction or pressure pumps and other constructions for the circulating means may be found within the scope of the invention as characterized by the appended claims.

The spacing plates 8 between electrodes of the same unit preferably are provided with transverse flanges 19 which overlie the edges of the adjacent electrodes, so that the porous spacing plate 10 is inclosed on all sides by non-porous material. The spacing means 11 and 11' have similar flanges 34 which also serve for inclosing porous spacing plates 10 made of wood or similar material. The electrolytic fluid, therefore, after having passed from the interior of the casing 11, through the adjacent spacing plate 10, and the pores of the electrodes, must necessarily flow through the other porous plate 10 and the perforations 9 of the non-porous spacing plate 8, and through the pores of the adjacent electrode.

The electric current generated or stored, respectively, in the battery is conveyed through bus-bars 21 which unite the lugs 22 of electrodes of the same polarity and these bus-bars are extended by means of projections 23 through the cover of the jar, these projections advisably being disposed within the nipples which also serve for the passage of the electrolytic fluid.

The assembly of the entire battery is facilitated by uniting all of the electrodes and spacing means prior to the insertion of the same into the jar. For this purpose the electrodes forming the terminal points of the electric battery or pile, are covered on that side which is not in opposition to another electrode, with an insulating coating 24 or an insulating plate or the like. Another plate, preferably of metal, which is indifferent to the electrolytic fluid, as indicated at 25, is in contact with the cover plate 24, and the two plates 25 at the ends of the series of electrodes are firmly clamped together by means of clamping bolts 26, provided with nuts 27 which rest against the outer surface of said plates 25. If any of the electrodes should become defective, it is only necessary to loosen the nuts on the clamping bolts until the electrode or the defective spacing means may be removed and another one inserted in place thereof.

The operation of an electric battery of this kind is about as follows:

After the electrodes have been placed in serial arrangement, alternating with the spacing means, and this spacing means again alternating so as to provide alternately a hollow spacing means and a solid spacing means, and after the lugs of electrodes of like polarity have been united by bus-bars which are adapted to extend through the cover of the jar, the electrodes are inserted in the jar and the same is completely filled with electrolytic fluid which also enters the interior of the hollow spacing means between the electrode units. The jar is hermetically closed by the cover and the pump connected with the nipples or with the reservoir, respectively, so as to circulate the electrolytic fluid through the jar.

If the pump is arranged and constructed to force the electrolytic fluid into the hollow spacing means by exerting a pressure in said means, the pressure exerted at any point of the fluid is transmitted in all directions of the same so that the electrolytic fluid from the interior of the spacing means 11 is forced through the perforations 12 of said spacing means, and in both of the lateral walls of the same, forcing the fluid to pass in opposite directions through the pores of adjacent wood plates and through pores of opposite electrodes. After having passed through the pores of the electrodes the fluid is forced through the pores of the wooden plates 10 or insulating plates of any suitable porous material, and flowing through the perforations of the solid spacing plates 9, the electrolytic fluid will pass through the pores of the adjacent electrode into the hollow spacing means 11' adjoining said electrode on the opposite side. These last named spacing means are in communication with the interior of the jar through the perforations 14, and the fluid from the jar is finally returned to the pump by the return flow pipe 18, to enter again in circulation in the same direction.

If the circulation is caused by pressing the fluid from the reservoir into the spacing means 11, the check valve on the reservoir may be rendered inoperative.

Although the invention is described here in connection with a lead storage battery, I desire it to be understood that I am aware of the fact that the efficiency of primary batteries, as well as all other storage batteries, may be enhanced by maintaining the electrolytic fluid in permanent or intermittent circulation through the pores of the electrodes. The electrolytic fluid may either be a liquid or a gaseous fluid and the electrodes may either have the shape of plates or any other suitable shape.

I claim:

1. In an electric battery the combination of a plurality of porous electrodes, hollow spacing means between said electrodes and means for forcing the electrolytic fluid from the interior of said spacing means in a plurality of directions through the pores of said electrodes from one side to the other side of the same.

2. In an electric battery the combination of a plurality of porous electrodes, hollow spacing means between said electrodes, means for forcing the electrolytic fluid from the interior of said spacing means through the pores of electrodes of opposite polarity and means for preventing the escape of the electrolyte from the interior in any other way but through the pores of the electrodes.

3. In an electric battery the combination of a battery receptacle, a plurality of electrodes, hollow spacing means between said electrodes and means for forcing the electrolytic fluid from the interior of some of the spacing means into the pores of electrodes and from the interior of other spacing means into the receptacle.

4. In an electric battery the combination of a battery receptacle, a plurality of electrodes arranged in units, hollow spacing means between adjacent units and means for conveying the electrolyte from certain of said units through the pores of electrodes of the units into other spacing means and from there into the receptacle.

5. In an electric battery the combination of a pair of porous electrodes, packing means between said electrodes, said packing means being in engagement with both electrodes and comprising porous elements in engagement with an electrode and non-porous perforated elements in engagement with said porous elements.

6. In an electric battery the combination of electrodes and separators, the separators including porous elements engaging the surface of the electrodes and non-porous elements in engagement with said porous elements, said non-porous elements having a flange engaging the marginal portions of said porous elements.

7. In an electric battery the combination of a plurality of electrodes, means for forcibly conveying the electrolyte through said electrodes, separators interposed between adjacent electrodes and means for preventing the lateral escape of the electrolytic fluid from the interspace between adjacent electrodes.

8. In an electric battery the combination of a jar, a plurality of electrodes arranged in units, spacing means interposed between each two units, means for forcing the electrolyte through the interior of said spacing means into the pores of the electrodes, certain of said spacing means being in communication with the electrolyte within the jar and other of said units being closed against communication with the electrolyte within said jar.

In testimony whereof I have hereunto set my hand in the presence of the two subscribing witnesses.

EDWARD SOKAL.

Witnesses:
BERTHOLD O. CLATT,
LOUISE BATES.